(12) United States Patent
Payne et al.

(10) Patent No.: US 6,353,343 B1
(45) Date of Patent: Mar. 5, 2002

(54) ISI-REJECTING DIFFERENTIAL RECEIVER

(75) Inventors: Robert Floyd Payne, Plano, TX (US); Scott H. Noakes, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/603,236

(22) Filed: Jun. 26, 2000

Related U.S. Application Data

(60) Provisional application No. 60/141,915, filed on Jun. 30, 1999.

(51) Int. Cl.[7] .................................................. H03F 3/45
(52) U.S. Cl. .......................................... 327/52; 327/65
(58) Field of Search .............................. 37/52, 65, 266, 37/268, 290; 330/253, 254, 306

(56) References Cited

U.S. PATENT DOCUMENTS 5,371,475 A * 12/1994 Brown ........................ 330/254
5,625,318 A * 4/1997 Sevenhans et al. ......... 327/563
6,208,134 B1 * 3/2001 Demma .................. 324/207.26

* cited by examiner

Primary Examiner—Tuan T. Lam
Assistant Examiner—Hiep Nguyen
(74) Attorney, Agent, or Firm—Pedro P. Hernandez; W. James Brady, III; Frederick J. Telecky, Jr.

(57) ABSTRACT

A digital differential receiver IC that rejects the inter-symbol interference (ISI) that is imposed upon differential digital signals when long runs of a digital state (0 or 1) are transmitted over long cables. The ISI-rejecting differential receiver IC is implemented in either bipolar technology (n-p-n or p-n-p) or in insulated gate FET technology (p-channel or n-channel). The primary differential pair of transistors is connected to a secondary differential pair of transistors through a filter network so that a high pass "shelf" filter transfer function exists between the differential input signals and the output signals. This transfer function mitigates ISI by reducing the gain for long runs of a digital state (low frequencies) and enhancing the gain for the state transition edges (high frequencies).

5 Claims, 4 Drawing Sheets

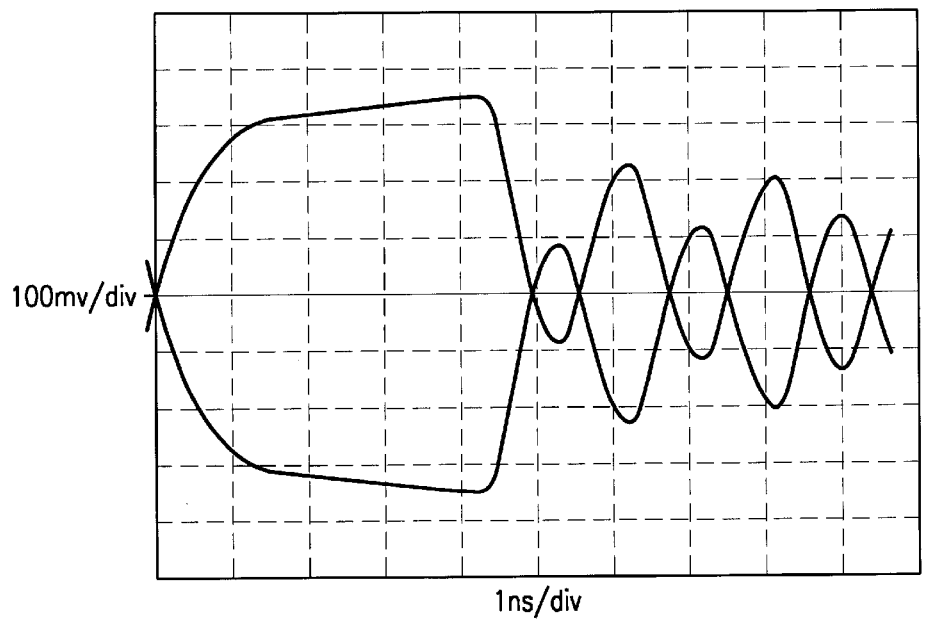
FIG. 1
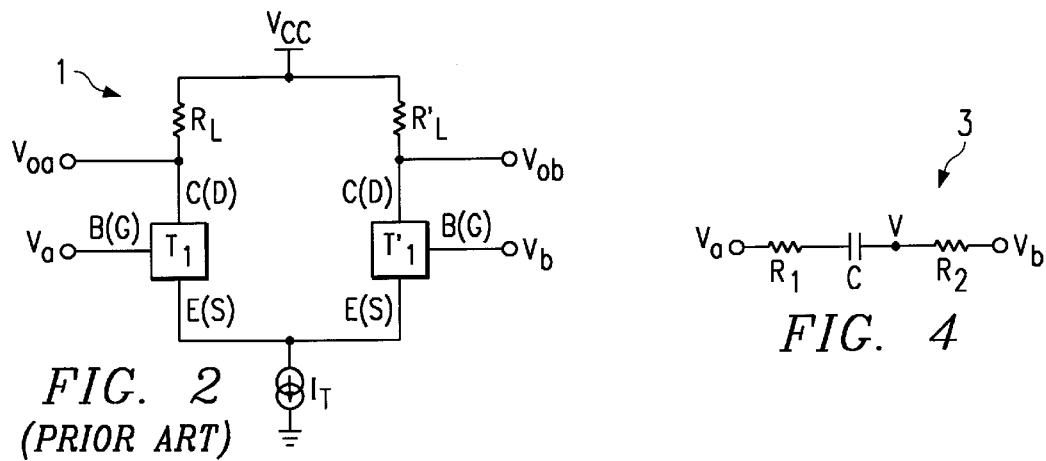
FIG. 2 (PRIOR ART)
FIG. 4
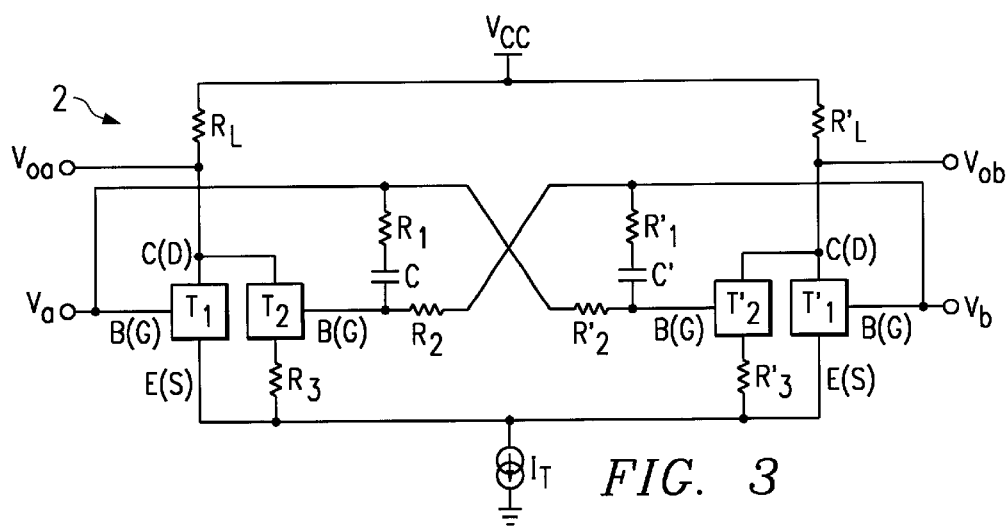
FIG. 3

ISI-REJECTING DIFFERENTIAL RECEIVER

This application claims priority under 35 USC §119 (e)(1) of Provisional Special Application No. 60/141,915, filed Jun. 30, 1999.

BACKGROUND OF THE INVENTION

1. Field of the Invention

This invention applies to the field of integrated circuits (IC) known as differential receivers. It is specific to IC devices used for receiving digital data that is transmitted over long transmission lines. The field includes all bipolar differential receivers and all insulated gate field effect transistor (IGFET) differential receivers, including CMOS circuits.

2. Background Information

When digital data signals that contain long runs of either ones or zeroes are sent over a long transmission line, the edges that correspond to the data transitions (0-1 or 1-0) become severely distorted by the bandwidth limitation and the frequency dispersion of the transmission line. This phenomenon, known as inter-symbol interference (ISI), moves the transition edges associated with these long runs from their ideal clock positions thus interfering with the correct recovery of data by the receiver.

The prior art in differential receivers does not provide a solution to this problem that is implemented at the receiver. Lacking a solution at the receivers, data transmission system designers have taken a system approach to mitigate the problem of ISI. In the systems approach, designers have used a technique called "pre-emphasis" in the driver circuit. For example, the transmission line driver asserts a 1-0 transition level that is stronger than a sustained 1-1 data level, and it asserts a 0-1 transition level that is stronger than a sustained 0-0 data level. These emphasized transitions tend to compensate for the anticipated distortion of the pulses that follow long high or long low bit sequences. The "pre-emphasis" system solution to the ISI problem complicates transmission system designs. Designers prefer a solution that is implemented at the differential receiver for use in systems where they have no control over the driver choice. As data transmission rates rise, ISI becomes even more problematic since high-speed circuits have decreased margins for timing errors. In these higher speed systems, both the driver and the receiver must be capable of addressing the ISI problem.

ISI creates data errors at the receiver by causing pulse width distortion that shifts the transition edges for the bits at the end of a long run of either ones or zeroes. FIG. 1 illustrates an oscilloscope plot of a differential "1111101010" bit pattern after transmission through 20 meters of cable. The prior art differential receiver generates output pulse transitions at the points where the two waveforms cross. Ideally, these data transitions should occur every 941 picoseconds (ps). However, because of ISI, the "11111" run pattern has a length of 4950 ps instead of the ideal value of 4705 ps. In addition, the "01010" pulses following the "11111" run also have distorted widths of ~625 ps, ~1200 ps, ~750 ps, ~1150 ps and ~750 ps, respectively, instead of the ideal value of 941 ps. Prior art differential receivers would produce output pulses with these same pulse width distortions.

FIG. 2 illustrates the prior art in digital differential receivers. The circuit consists of two matched bipolar transistors (or IGFET), $T_1$ and $T_1'$, connected in common at their emitters (or sources) to a current source $I_T$. The collector (or drain) of each transistor is connected to the supply voltage $V_{cc}$ through matched load resistors $R_L$ and $R_L'$. The differential inputs $v_a$ and $v_b$ are applied at the base (or gate) of each transistor. The differential outputs $v_{oa}$ and $v_{ob}$ are taken from the collector (or drain) of each transistor. Each time that the differential signal reaches zero, a transition occurs between the high and the low states of each of the outputs $v_{oa}$ and $v_{ob}$ relative to supply ground. If $v_a$ is greater than $v_b$ as the differential input approaches zero then the transition is in one direction. When $v_a$ is less than $v_b$ approaching a zero then the transition is in the opposite direction. The polarity of a transition at $v_{oa}$ is the opposite of that at $v_{ob}$.

SUMMARY OF THE INVENTION

The invention provides an advancement of the art in differential receiver integrated circuits because it implements rejection of ISI at the receiver. Prior art differential receivers generate output pulses whose widths are affected by the preceding data. The ISI-rejecting differential receiver does not, so high levels of ISI in the input signal are rejected. For many digital data transmission systems this new type of differential receiver IC can provide sufficient ISI rejection to eliminate the need for "pre-emphasis" at the driver. It also enables still higher data transmission speeds since it allows the mitigating technique of "driver pre-emphasis" to be combined with ISI rejection at the receiver. The invention applies to all bipolar (n-p-n or p-n-p) technologies and to all IGFET (p-channel or n-channel) technologies, including CMOS.

A primary differential transistor pair is augmented with a secondary (weaker) transistor pair and a pair of filter networks. These components combine the signals from both sides of the difference circuit to create a high pass "shelf" filter between the differential input and the outputs. At low frequencies, the dual-pair network reduces the gain of the differential amplifier. At high frequencies, the gains of the two pairs add. The break frequency for the gain change is set by an RC time constant of the network. The ratio of input device sizes and resistor ratios in the network determine the difference between the minimum gain and the maximum gain.

BRIEF DESCRIPTION OF THE DRAWINGS

FIG. 1 illustrates the phenomenon of inter-symbol interference in digital data transmission systems.

FIG. 2 illustrates the generalized circuit in the prior art of digital differential receivers.

FIG. 3 shows the generalized circuit for ISI-rejecting differential receivers.

FIG. 4 is an approximately equivalent circuit for the filter network that exists on each side of the ISI-rejecting differential receiver.

DESCRIPTION OF THE PREFERRED EMBODIMENTS

Figure 5:
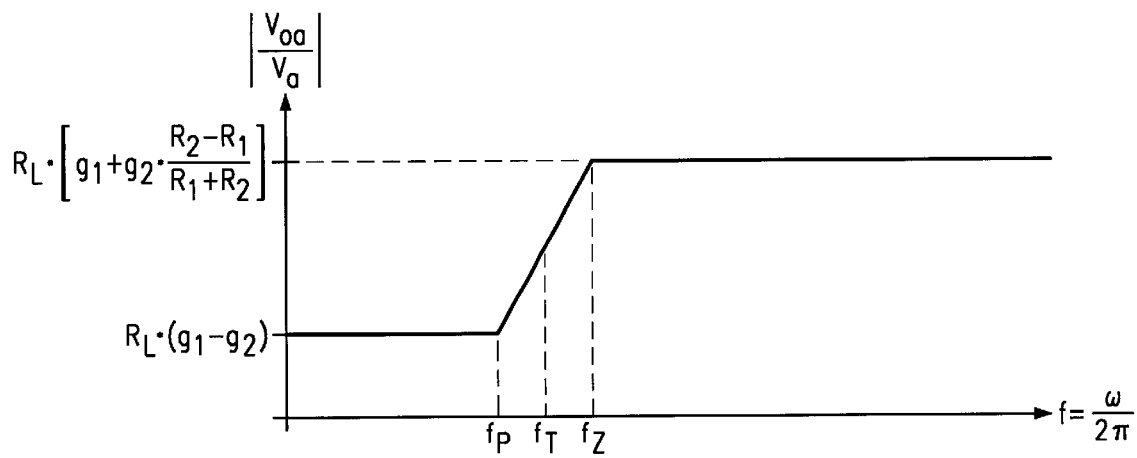
FIG. 5 illustrates the magnitude of the transfer function of the ISI-rejecting differential receiver in asymptotic form.

FIG. 3 illustrates the generalized class of embodiments of the disclosed invention and shows that the ISI-rejecting differential receiver circuit builds on the basic differential receiver 1 of FIG. 2. Each side of the ISI-rejecting differential receiver 2 has four additional circuit components. A secondary transistor $T_2$ or $T_2'$ has its collector (or drain) connected directly to the collector (or drain) of the primary transistor $T_1$ or $T_1'$. The base (or gate) of the secondary transistor is connected to the base (or gate) of the primary transistor by a capacitor C and a resistor $R_1$ or $R_1'$ in series. The base (or gate) of the secondary transistor also is tied through a resistor $R_2'$ or $R_2$ to the opposing differential input node [base (or gate) of the primary transistor on the opposite side of the circuit]. The emitter (or source) of the secondary transistor is connected to the emitter (or source) of the primary transistor through matched resistors $R_3$ and $R3'$. The remaining components of circuit 2 in FIG. 3 are connected as illustrated in circuit 1 of FIG. 2, as previously described.

The IC may be constructed in either bipolar (n-p-n or p-n-p) technology or in IGFET (p-channel or n-channel) technology. In a CMOS process, all resistors can be implemented as their transistor equivalent. The design of one side of the ISI-rejecting differential receiver is identical to the design of the opposing side. Consider the left side of the circuit 2 as shown in FIG. 3. Because of $R_3$ and because the size of $T_2$ is smaller than the size of $T_1$, the transconductance $g_2$ of $T_2$ is less than the transconductance $g_1$ of $T_1$. Since the input resistance into the base (or gate) of $T_2$ is much larger than either $R_1$ or $R_2$, the current into the base (or gate) of $T_2$ is insignificant. This means that the simplified network 3 of FIG. 4 closely approximates the actual filter network of $T_2$, $R_1$, C and $R_2$.

Consider the voltage v on the node between C and $R_2$ in network 3 of FIG. 4, where $s=j \cdot \omega$ is the LaPlace transform argument and $\omega$ is the temporal cycle frequency.

$$v = v_b \frac{R_1 + \frac{1}{s \cdot C}}{R_1 + \frac{1}{s \cdot C} + R_2} + v_a \frac{R_2}{R_1 + \frac{1}{s \cdot C} + R_2}$$

For differential input signals, $v_a = -v_b$, so that $$v = v_a \frac{s \cdot C \cdot (R_2 - R_1) - 1}{s \cdot C \cdot (R_1 + R_2) + 1}$$

Then the output voltage on the left side of the ISI-rejecting differential receiver 2 in FIG. 3, $$v_{oa} = v_a \cdot g_1 \cdot R_L + v \cdot g_2 \cdot R_L$$

is approximated well by $$v_{ou} = v_a \cdot g_1 \cdot R_L + v_a \cdot g_2 \cdot R_L \frac{s \cdot C \cdot (R_2 - R_1) - 1}{s \cdot C \cdot (R_1 + R_2) + 1}.$$

The transfer function of the receiver is expressed by $$\frac{v_{ou}}{v_a} = g_1 \cdot R_L - g_2 \cdot R_L \frac{1 - s \cdot C \cdot (R_2 - R_1)}{1 + s \cdot C \cdot (R_1 + R_2)}$$

The magnitude of the frequency response this transfer function is illustrated in FIG. 5 in asymptotic form. It shows a transition from a low gain state with asymptote $R_L \cdot (g_1 - g_2)$ at low frequencies to a high gain state with asymptote $R_L \cdot [g_1 + g_2 \cdot (R_2 - R_1)/(R_1 + R_2)]$ at high frequencies. This function has a pole at $$f_P = [2\pi \cdot C \cdot (R_1 + R_2)]^{-1}$$

and a zero at $$f_Z = [2\pi \cdot C \cdot (R_2 - R_1)]^{-1}$$

Defining a break or transition frequency ($f_T$) as the midpoint between these two frequencies, then $$f_T = R_2 \cdot [2\pi \cdot C \cdot (R_1 + R_2) \cdot (R_2 - R_1)]^{-1}$$

with the implied RC time constant.

During a long run length of ones or zeroes, the base (or gate) of the weaker transistor and the base (or gate) of the stronger transistor charge to opposite polarities so that they oppose one another and the gain decreases. When the input switches states, the two transistors work in tandem instead of opposition thereby increasing the gain. This switches the output more quickly at the end of a long run of ones or zeroes and the data edges are shifted closer to their ideal positions.

Figure 6A:
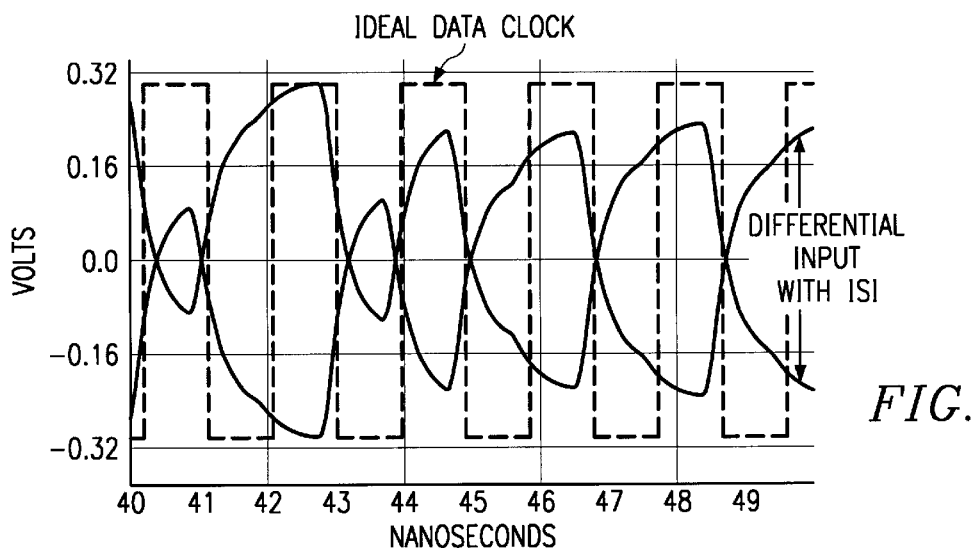
FIG. 6 shows the simulated response of the ISI-rejecting differential receiver to a pseudo-random differential input signal that has been corrupted by ISI and compares it with one that lacks the ISI-rejecting components.
Figure 6B:
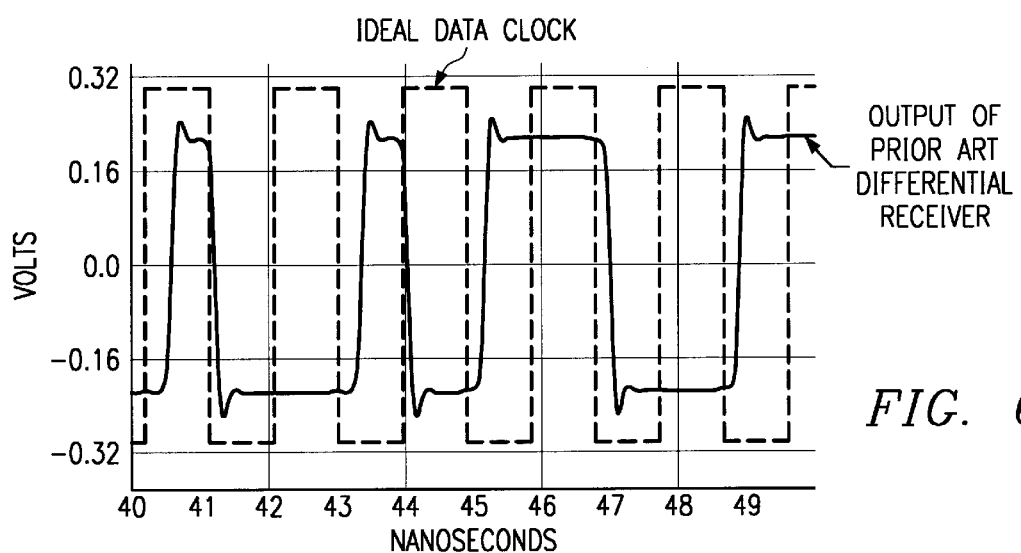
Figure 6C:
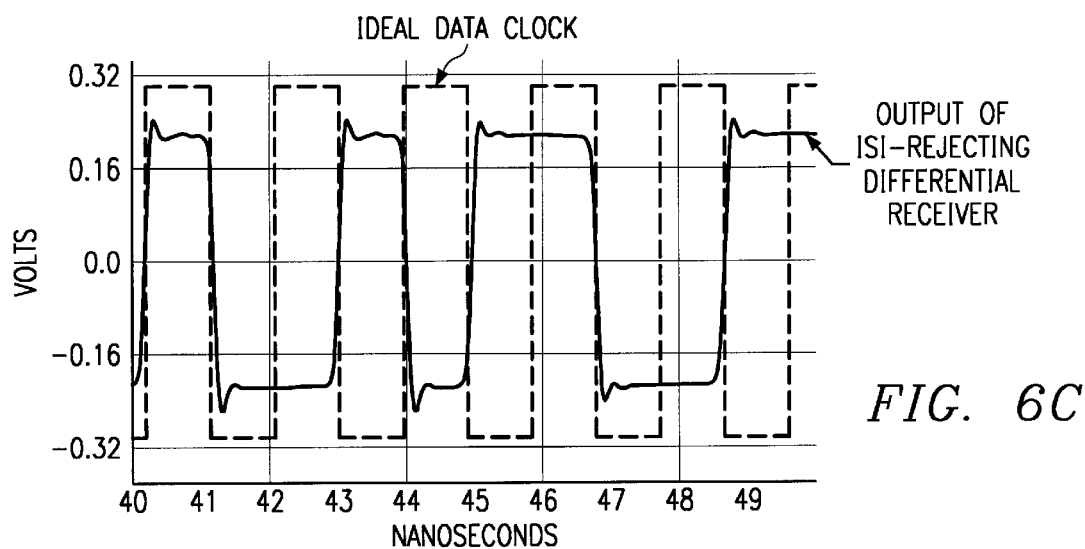

FIG. 6 illustrates graphically the results of a computer simulation (SPICE) that compares the behavior of the ISI-rejecting circuit 2 of FIG. 3 with the behavior of circuit 1 of FIG. 2. The same input signal was used for each of the two circuits in the simulation. It was generated as a pseudo-random digital bit pattern, transformed into a differential signal and then contaminated by ISI corresponding to a long cable transmission. The simulation of circuit 1 yields a transfer function that is constant with frequency. The simulation of circuit 2 yields the transfer function of FIG. 5. The simulation output for the prior art differential receiver exhibits large shifts between the output pulse edges and the corresponding ideal clock edges. The simulation output for the ISI-rejecting, differential receiver exhibits very small shifts between the output pulse edges and the corresponding ideal clock edges.

Figure 7:
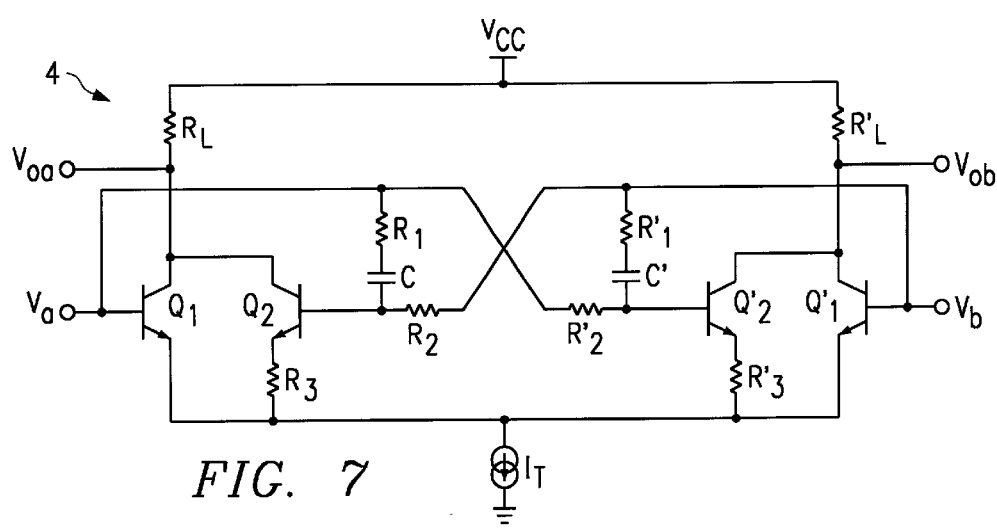
FIG. 7 shows the preferred embodiment for n-p-n bipolar IC technology.

In the n-p-n bipolar embodiment 4 of the ISI-rejecting differential receiver illustrated in FIG. 7, the generalized transistor $T_1$ of FIG. 3 is realized as the n-p-n transistor $Q_1$. The generalized transistor $T_2$ is realized as the n-p-n transistor $Q_2$. The generalized transistor $T_1'$ is realized as the n-p-n transistor $Q_1'$. The generalized transistor $T_2'$ is realized as the n-p-n transistor $Q_2'$.

Figure 8:
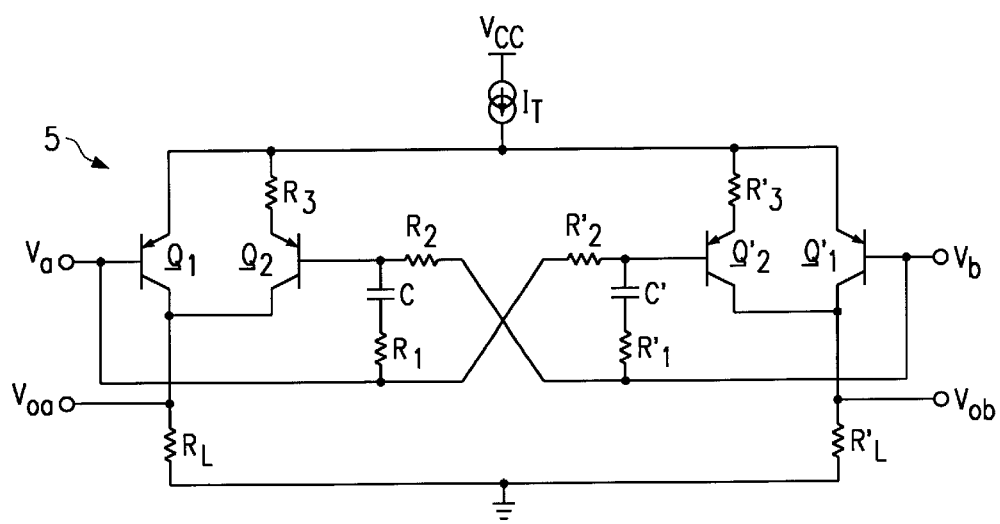
FIG. 8 shows the preferred embodiment for p-n-p bipolar IC technology.

In the p-n-p bipolar embodiment 5 of the ISI-rejecting differential receiver illustrated in FIG. 8, the generalized transistor $T_1$ of FIG. 3 is realized as the p-n-p transistor $Q_1$. The generalized transistor $T_2$ is realized as the p-n-p transistor $Q_2$. The generalized transistor $T_1'$ is realized as the p-n-p transistor $Q_1'$. The generalized transistor $T_2'$ is realized as the p-n-p transistor $Q_2'$. In this embodiment, the current source $I_T$ is connected between the supply positive $V_{CC}$ and the common node of $R_3$ and $R_3'$ and the common node between $R_L$ and $R_L'$ is connected to the supply return.

Figure 9:
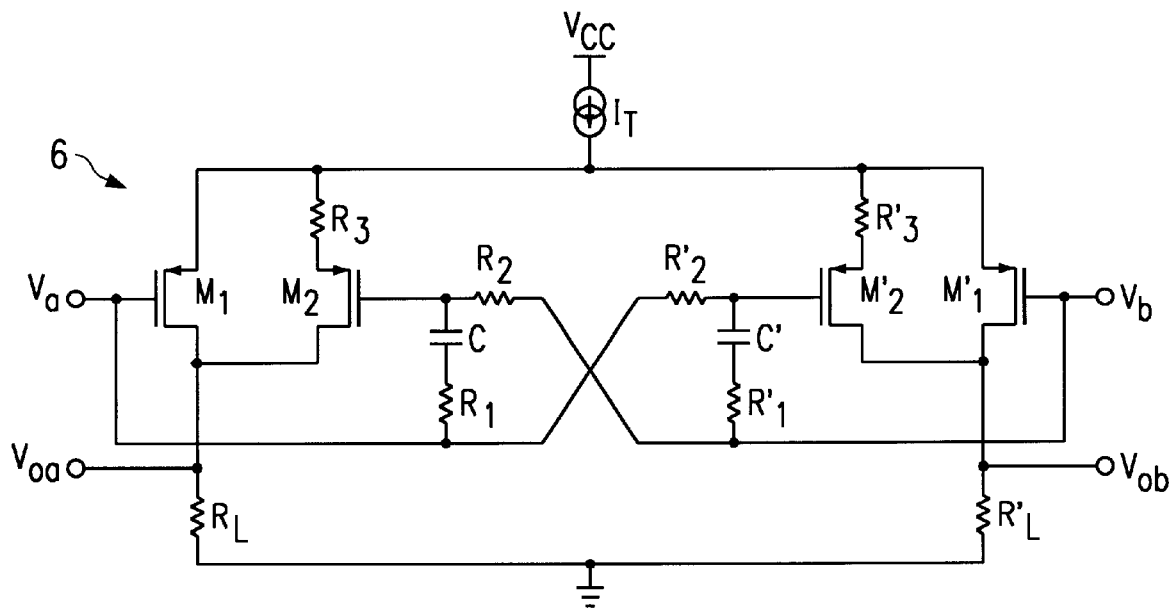
FIG. 9 shows the preferred embodiment for p-channel IGFET IC technology.

In the p-channel IGFET embodiment 6 of the ISI-rejecting differential receiver illustrated in FIG. 9, the generalized transistor $T_1$ of FIG. 3 is realized as the p-channel IGFET $M_1$. The generalized transistor $T_2$ is realized as the p-channel IGFET $M_2$. The generalized transistor $T_1'$ is realized as the p-channel IGFET $M_1'$. The generalized transistor $T_2'$ is realized as the n-channel IGFET $M_2'$. In this embodiment, the current source $I_T$ is connected between the supply positive $V_{CC}$ and the common node of $R_3$ and $R_3'$ and the common node between $R_L$ and $R_L'$ is connected to the supply return.

Figure 10:
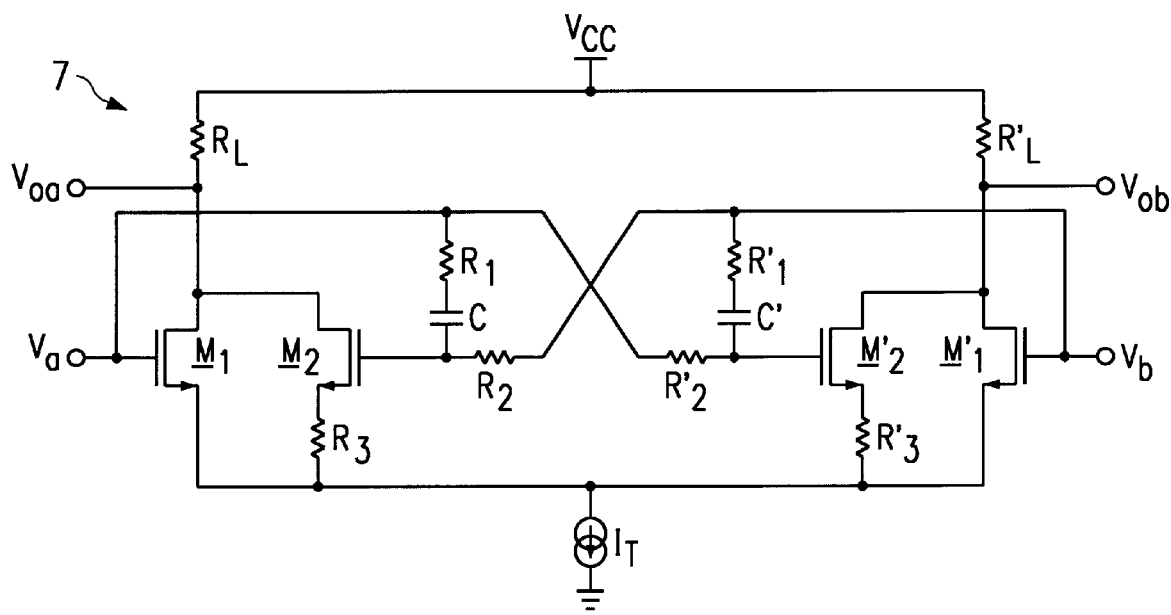
FIG. 10 shows the preferred embodiment for n-channel IGFET IC technology.

In the n-channel IGFET embodiment 7 of the ISI-rejecting differential receiver illustrated in FIG. 10, the generalized transistor $T_1$ of FIG. 3 is realized as the n-channel IGFET $\underline{M_1}$. The generalized transistor $T_2$ is realized as the n-channel IGFET $\underline{M_2}$. The generalized transistor $T_1{}'$ is realized as the n-channel IGFET $\underline{M_1}'$. The generalized transistor $T_2{}'$ is realized as the n-channel IGFET $\underline{M_2}'$.

While the invention has been described in the context of a preferred embodiment, it will be apparent to those skilled in the art that the present invention may be modified in numerous ways and may assume many embodiments other than that specially set out and described above. Accordingly, it is intended by the appended claims to cover all modifications of the invention which fall within the true spirit and scope of the invention.

What is claimed is:

1. A differential receiver circuit having inter-symbol interference (ISI) rejection, the circuit including a differential input for receiving a differential input signal and a differential output for providing a differential output signal, the circuit comprising:

a primary pair of differential transistors;

a secondary pair of differential transistors; and a filter network coupled between the primary and secondary pair of differential transistors, the filter network forming a high pass "shelf" filter transfer function between the differential input signal and the differential output signal.

2. A differential receiver circuit as defined in claim 1, wherein the transfer function of the filter network mitigates ISI by reducing the gain of the differential receiver circuit when a long run of a digital state of said input signal having the same logic level (low frequencies) is received at the differential input.

3. A differential receiver circuit as defined in claim 1, wherein the transfer function of the filter network enhances the gain of the differential receiver circuit when state transition edges of said input signal (high frequencies) are received at the differential input.

4. A differential receiver circuit as defined in claim 1, wherein a break frequency is set by an RC time constant of the filter network.

5. A differential receiver circuit as defined in claim 1, wherein each of the transistors in the primary differential transistor pair have a device size and the filter network includes resistors and the ratio of the input device sizes and resistor ratios in the filter network determine the difference between the minimum and maximum gain provided by the differential receiver circuit.

* * * * *